No. 676,129. Patented June 11, 1901.
W. GOLDIE.
APPARATUS FOR SURFACING RAILROAD TRACKS.
(Application filed July 25, 1900.)
(No Model.) 2 Sheets—Sheet 2.
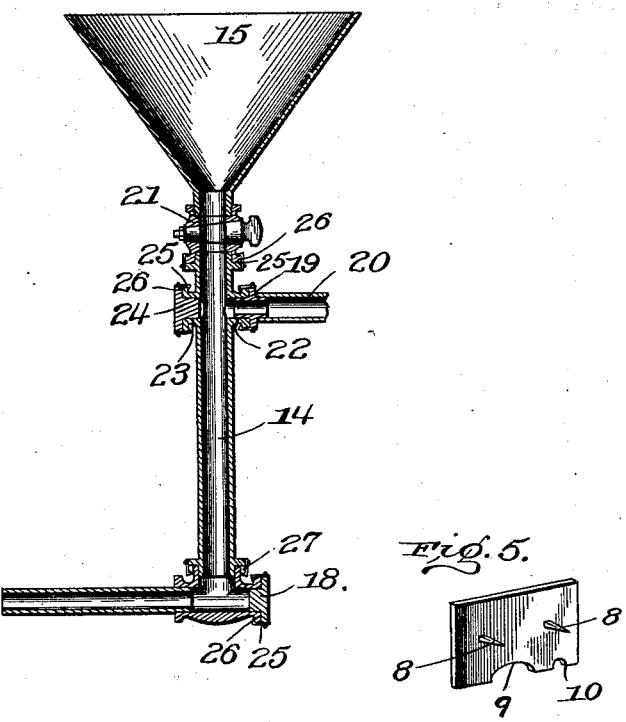
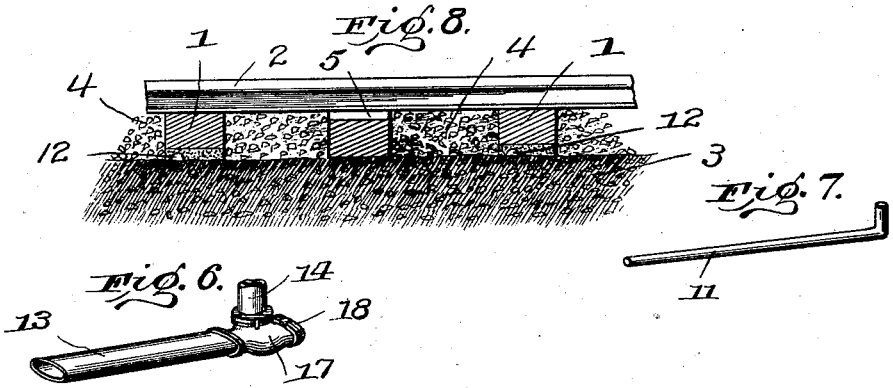
Witnesses.
Allan W. Foose
Walter Famause
Inventor:
William Goldie
By Kay & Totten
Attorneys.

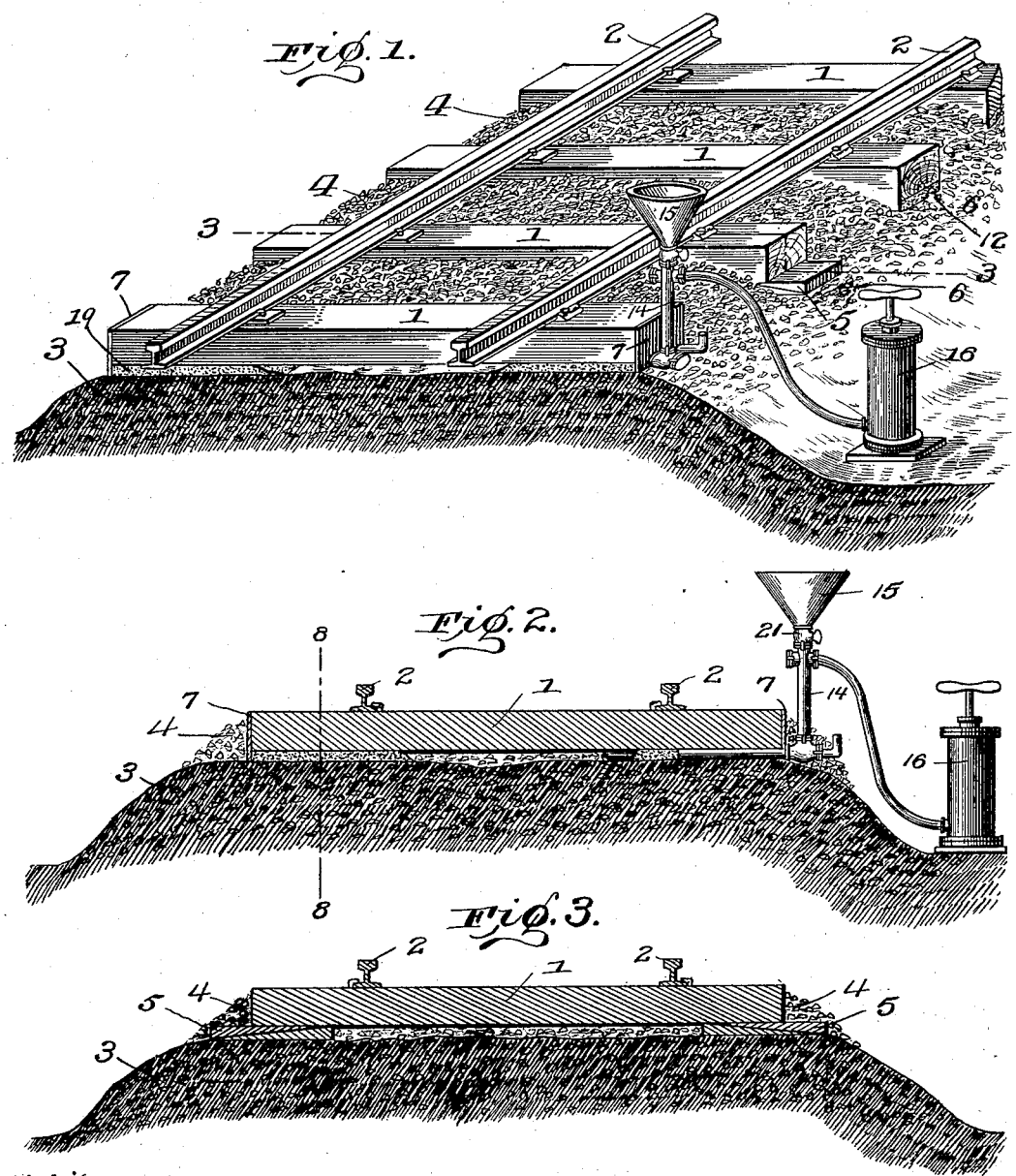

UNITED STATES PATENT OFFICE.

WILLIAM GOLDIE, OF WILKINSBURG, PENNSYLVANIA.

APPARATUS FOR SURFACING RAILROAD-TRACKS.

SPECIFICATION forming part of Letters Patent No. 676,129, dated June 11, 1901.

Application filed July 25, 1900. Serial No. 24,745. (No model.)

*To all whom it may concern:*

Be it known that I, WILLIAM GOLDIE, a resident of Wilkinsburg, in the county of Allegheny and State of Pennsylvania, have invented a new and useful Improvement in Apparatus for Surfacing Railroad-Tracks; and I do hereby declare the following to be a full, clear, and exact description thereof.

My invention relates to apparatus for surfacing railroad-tracks, its object being to provide means for bringing the tracks to and holding them at proper surface without the necessity of tamping, which is the main or only means now employed in the ordinary steam-railroad for such purposes.

In an application of even date herewith, Serial No. 24,744, I have described the method of surfacing railroad-tracks by injecting cement under the ties and upon the ballast bed giving them support, and thereby forming cement supporting-beds for the ties interposed between the bed of ballast, which has generally been solidly packed by the weight of the passing trains, and the tie itself without disturbing such solid ballast supporting-bed, the invention including other improvements, as more particularly set forth therein.

The present invention has for its object to provide means for the injecting of the cement under the ties and for forming the interposed cement beds between them and the ballast, fully described in said application.

It comprises, generally stated, means for injecting the cement under the ties—such, for example, as an injector-pipe extending under the same, a feeding-basin and feeding-pipe leading thereto, and an air or like force-pump for forcing the cement through such injector-pipe under the ties.

It also consists in certain improvements in the construction of such apparatus.

It also consists in combining with the injecting apparatus mechanical supports for the rails at some of the ties, so that when the track is brought to proper surface it may support the passing trains until the cement is set under the other ties, after which the cement beds may be formed under the ties where the rails have been so mechanically supported.

It also consists in certain other improvements, as hereinafter set forth.

To enable others skilled in the art to make and use my invention, I will describe the same more fully, referring to the accompanying drawings, in which—

Figure 1 is a perspective view of a railroad-track having the invention applied thereto. Fig. 2 is a side view of the apparatus, showing the track in cross-section. Fig. 3 is a cross-section on the line 3 3, Fig. 1. Fig. 4 is an enlarged view of the mixing-basin and feeding and injecting pipes. Fig. 5 is a perspective view of the dam-plate. Fig. 6 is an enlarged perspective view of the injector-pipe and its coupling with the feeding-pipe. Fig. 7 is a perspective view of the channel-molding bar; and Fig. 8 is a longitudinal section on the line 8 8, Fig. 2, the shims being placed above the tie.

In the use of the invention any suitable material of the nature of cement which is quick-setting, so as to form a solid interposed bed between the tie and the ballast bed, may be employed, either Portland cement or cement of like nature, or asphaltum or like material.

The injecting apparatus forming the subject of the present invention will of course be constructed according to the material used and the condition in which it is used, the invention including, broadly, any suitable mechanism for injecting the cement or like plastic material operated either mechanically or under fluid-pressure or otherwise. The mechanism particularly described in the present application is considered very suitable for the purpose and of simple form, considering the condition under which such mechanism will have to be used in isolated territory through which railroads often pass.

The invention is illustrated in connection with an ordinary single track. The ties 1 are of course the ordinary wooden ties, though the invention may be employed with metal ties, if considered desirable. The ties rest upon the regular ballast bed 3, and the ballast is filled in between the ties, as at 4, this interposed filling of ballast extending up toward or to the top of the ties. The custom is to pack the ballast but loosely under the center of the ties, the ballast being tamped as firmly as possible under the portions thereof on which the rails 2 rest—that is, the outer portions of the ties for a distance of from fifteen to eighteen (15 to 18) inches from the ends.

As the invention will be used to great extent in connection with the surfacing of track previously laid, I will describe it in connection with the same. In order to support the weight of any passing train during the surfacing of the track, I employ any suitable mechanical supports for the rails at different points, such as the shims 5, fitting under some of the ties, such as shown in Figs. 1 and 3, or like shims 5 between the rails and ties, as shown in Fig. 8, the shims shown being simply tapering pieces of wood, one being supported under the tie and the other being driven under it, so that a sufficiently strong support is provided for these ties to sustain the track while the cement beds are being formed under the other track. The ties being thus raised to proper surface in accordance with the requirements of the engineers, depending, of course, upon whether the track is curved or straight, as is well known to road masters, the shims 5 are inserted. The workmen then clear out the ballast which may extend around the ends of the ties, as at 6, in order to give free access for the insertion of the cement, and to close the end of the space under the ties I employ the dam-plates 7, each of which fits against the end of the tie-body and forms a dam to prevent the cement from flowing backwardly from under the tie. This dam-plate is shown in perspective in Fig. 5, being simply a metal plate corresponding in width to the tie-body and being of sufficient length to extend up along the end of the tie and hold thereto, the dam-plate having spikes or prongs 8, which take into the tie to hold it in place. The dam-plate is also preferably formed with openings or recesses 9 10, close to or in its lower edge, one opening 9 for the insertion of the injector-pipe, by which the cement is injected under the tie, and the other opening 10 for the insertion of the drainage mold-bar 11, which is shown in the drawings as a long bar inserted under the tie for a greater distance than the cement bed to be formed, so as to insure a regular drainage-canal 12 for the flow of the water from under the mid-portion of the tie, and thereby prevent rotting action on account of confined moisture.

The injecting apparatus illustrated in the drawings consists of an injector-pipe 13, extending under the tie, a feeding-pipe 14, communicating therewith, a mixing funnel or basin 15, communicating with the injector-pipe, and an air force-pump 16, arranged to generate air-pressure for injecting the cement. The injector-pipe 13 is preferably made flat or oval in cross-section, so as to enter through the narrow space under the tie, and passes through the opening 9 and has preferably a T-joint 17 to receive the end of the feeding-pipe 14 and a plug 18, closing the other opening, to facilitate cleaning of the injector-pipe, it being of course desirable that the parts shall be separable to provide for quick and even cleaning and to prevent the setting of the cement in the pipes. The feeding-pipe 14 is made of substantially the same cross-sectional area as the injector-pipe and extends up above the tie and supports the basin 15, such feed-pipe being intended to receive a charge from the basin, which is forced by air-pressure through the injector-pipe under the tie. At the upper end of the injector-pipe is the coupling 19 for the hose 20, leading to the force-pump 16. An ordinary hand-operated air force-pump is considered the most desirable for the purpose, and it needs no further description. The basin 15 is preferably made funnel-shaped, so as to feed the cement down into the feeding-pipe, it providing means for the mixture of the dry cement material with the water, so as to bring the same to the proper plastic condition, and when so used the lower end of the basin is closed by the valve 21. Any suitable valve may of course be used; but I prefer to have an ordinary rotating plug-valve having an opening corresponding in inner diameter to the base or smaller end of the funnel, so that when necessary the basin and its lower or smaller end may be easily and quickly cleaned from the cement contained therein, such as by the passage of a bar through the lower end. It is important also to provide for the quick cleaning of all parts of the feeding-pipe, and for that purpose it will be noticed that opposite opening 22 of the coupling 19, leading to the hose-pipe 20, a like opening 23 is made, so as to provide for the passage of a bar across the feed-pipe to remove any cement which may be lodged and set therein, this opening being closed by the plug 24. The hose connection of course can be made with either one of the openings 22 or 23, as desired.

In Fig. 4 I have illustrated the upper end of the feed-pipe and one form of spring-coupling suitable for use with the apparatus, as well as a plug 24 for closing the opening in the coupling 19, which is not in use. Such plug extends in flush with the interior of the feed-pipe 14, so that in mechanically cleaning the same none of the cement will be lodged in the opening. For coupling the different parts I employ spring-clips 25 on one coupling member engaging with an annular flange 26 on the other coupling member to sustain the parts under the pressure of the force-pump, grooves 27 in the flange permitting opening of the coupling, so leaving all such parts free to be quickly opened and cleaned. The plugs 18 and 24 may be held to place in like way.

In the use of the apparatus above described after the track has been brought to proper surface, being lifted by jacks or other means, and the rails have been mechanically supported by the shims at certain of the ties the operator places the dam-plate 7 against the end of the tie under which the interposed supporting cement bed is to be formed, and he supports the basin with the other parts in position. The cement may be either previously mixed or may be mixed in the basin, and where Portland or like cement is used gravel, sand, or small broken stone may also be mixed with the same, the cement being brought to a condition sufficiently fluid to flow down into the feeding-pipe 14. The injector-pipe is inserted the proper distance under the tie, and by the opening of the valve 21 the cement flows down into the feeding-pipe until it is filled, or if it is in proper condition it may continue to flow down and pass out through the injector-pipe under the tie. If it is not sufficiently plastic to flow, the operator closes the valve 21 and then through the force-pump 16 forces air above the body of cement in the feeding-pipe 14, when the air under pressure above the body of cement forces the cement down through the same and injects it under the tie, forming the interposed cement bed 29 under that end of the tie. The feeding-pipe may be refilled as often as necessary, the injector-pipe moved from position to position and drawn back, it being desirable to form a bed extending directly under the rail and for some distance beyond the same, and the interposed cement bed 19 being made of sufficient area to properly support the end of the tie. As the cement is in plastic condition, it naturally fills up the interstices in the gravel bed under the tie and ballast between the ties and conforms to the under face of the tie-body, forming a broad supporting-surface, which when set gives a solid firm support to the tie. Instead of injecting the same when in plastic condition it is evident that the cement-forming material when still dry may be injected under the tie, moisture for setting the same being either subsequently fed thereto or the moisture contained in the ballast being utilized for that purpose. So in like manner any apparatus for mechanically projecting the material under the tie may be used. As the cement is only intended to be used either in a plastic or dry state, it will flow but little farther than the point to which it is injected under the tie, so that there is practically no necessity for confining the inner end of the space which is to be filled. The cement can be supplied in this way under each end of the tie while the track is mechanically supported, as above stated, at the proper level desired, and the track is permitted to rest in that condition until the cement is fully set and ready to support the ties, when the drainage mold-bars 11 may be withdrawn, the dam-plates 8 removed, and the operation then repeated with the ties where the rails have been so mechanically supported—such as each alternate tie, as above referred to—and while the cement beds are being formed under these ties the previously formed and set cement beds will give the necessary support for the track and any train passing over it.

Where new tracks are being formed after the road has been regularly laid, a train should be passed over the track, so as to compact the ballast as far as possible by the weight of the train, as is the regular custom, and if the track is not then in service it may be surfaced in the way above described, being supported at proper height, and the cement beds may be formed under all the ties at one time, the track being supported by the jacks until all the cement beds are set and ready to receive the load. Under other circumstances the invention may be employed as found necessary, such variations in the apparatus or its use as would naturally occur being of course included within the scope of the invention.

By the use of the invention and the method described in the said companion application the regular solid compacted beds for the ties formed by the weight of the passing trains are not in any way disturbed; but instead of that a solid support conforming to any irregularities in such ballast-bed and conforming to the under face of the portion of the tie supported is provided, this cement bed being of the full width of the tie and giving a broad solid support thereto conforming to the irregularities of the tie-body, so that a solid and perfect support therefor is obtained. The cement supporting-beds so formed also unite to some extent with the ballast below and extending up the sides of the ties and bind the whole together into a solid supporting-block for the tie. It is also evident that the difficulties heretofore experienced on account of the ballast holding the moisture in contact with the tie-bodies will be largely overcome, as the cement in conforming to the shape of the tie-body will prevent entrance of such moisture to an appreciable extent, and therefore prevent rotting, while the center portion of the tie being but loosely ballasted and freely drained will not be liable to rotting action. The main difficulties with the use of gravel ballast are also overcome, the ordinary gravel-ballasted track being liable, through the yielding of the ballast, to force out the same when a train passes over the same and in rising again when relieved of the load to suck in the air, such action, by the pumping out of the air, working out, practically, all the small particles of sand or dirt in the form of dust, rendering travel exceedingly disagreeable and gradually carrying off and loosening the ballast and making resurfacing necessary. It is evident that the cement beds formed in accordance with the invention will entirely prevent such action, as the loose bodies of sand will, as above stated, be united or bound to the cement supporting-bed, which binds the whole together and prevents this difficulty. The difficulty of the wearing of the stone ballast into the ties will also be overcome, as the cement will flow around the stone ballast, forming a solid bed conforming to the shape of the tie and supporting it, as above referred to, and giving support for the full width of the tie instead of on a few points of the stone ballast, as in the present track. As the solid beds formed by the weight of the passing trains are not disturbed in the surfacing of the track, but the interposed cement supporting-beds simply rest thereon, and such beds are strong and solid, it is evident that after the track is once surfaced in this way there will be little or no settling, the only possible settling being in the ballast in places where it has not been sufficiently packed, and in such cases a fresh layer of cement may be injected, if necessary, which can easily be done by forming the cement more fluid, so that it will flow into the small space between the tie and cement bed previously formed. On account of the much more solid supports so given to the ties the strength of the track to resist strain is of course very largely increased, and it is believed that by the invention a track will be made sufficiently strong to sustain the weight of the heavy rolling-stock now in use or heavier rolling-stock and to sustain much higher speeds of trains than now employed.

The use of the invention will effect a large saving in the cost of maintenance of roads, considering the fact that when once applied to a solidly-packed track resurfacing will seldom be necessary.

What I claim as my invention, and desire to secure by Letters Patent, is—

1. In combination with a railroad-track, a dam-plate adapted to engage with the tie, and injecting apparatus adapted to inject cement under the tie and back of the dam-plate.

2. In combination with a railroad-track, a dam-plate having prongs thereon adapted to engage the end of the tie and injecting apparatus adapted to inject cement back of said plate.

3. In combination with a railroad-track, a dam-plate adapted to engage the end of the tie having openings in the base thereof, and injecting apparatus having an injector-pipe entering through said opening and adapted to inject cement under the tie.

4. In combination with a railroad-track, a dam-plate adapted to engage the end of the tie and having an opening in the base thereof, a channel-molding bar adapted to pass through said opening under the tie and injecting apparatus adapted to inject cement back of said dam-plate and around said channel-molding bar.

5. In combination with a railroad-track, a dam-plate adapted to engage the end of the tie and having two openings at or near the base thereof and a channel-molding bar entering through one opening and passing under the tie, and injecting apparatus entering through the other opening and adapted to inject cement under the tie and around said bar.

6. An injecting apparatus for injecting cement under railroad-tracks having an injecting-pipe adapted to pass under the track, a vertical feed-pipe communicating therewith, a basin at the upper end of said feeding-pipe and fluid-pressure apparatus communicating with the upper end of said feeding-pipe below the basin and adapted to force the cement therefrom.

7. In apparatus for injecting cement under railroad-tracks, the combination of a vertical feeding-pipe, a basin above the same, a stop-valve at the base of the basin and fluid-pressure apparatus communicating with the upper end of the feed-pipe below the stop-valve for forcing the cement therefrom.

8. In apparatus for injecting cement under railroad-tracks, a feeding-pipe having coupling connections at the upper end thereof in line with each other, one of said connections being closed by a removable plug, the inner end of which conforms to the interior of the pipe.

9. In apparatus for injecting cement under railroad-tracks, a pipe for the passage of the cement having a cleaning-opening to form a straight course through or across the same, in combination with a removable plug fitting in said opening.

In testimony whereof I, the said WILLIAM GOLDIE, have hereunto set my hand.

WILLIAM GOLDIE.

Witnesses:
F. W. WINTER,
ROBERT C. TOTTEN.